United States Patent
Hwang et al.

(10) Patent No.: US 12,465,591 B2
(45) Date of Patent: Nov. 11, 2025

(54) USE OF CARBAMATE COMPOUND FOR PREVENTING, ALLEVIATING OR TREATING DIABETIC PERIPHERAL NEUROPATHY OR CHEMOTHERAPY-INDUCED PERIPHERAL NEUROPATHY

(71) Applicant: SK BIOPHARMACEUTICALS CO., LTD., Gyeonggi-do (KR)

(72) Inventors: Sun Gwan Hwang, Gyeonggi-do (KR); Ji Won Lee, Gyeonggi-do (KR)

(73) Assignee: SK BIOPHARMACEUTICALS CO., LTD., Gyeonggi-Do (KR)

( * ) Notice: Subject to any disclaimer, the term of this patent is extended or adjusted under 35 U.S.C. 154(b) by 831 days.

(21) Appl. No.: 17/286,529

(22) PCT Filed: Oct. 18, 2019

(86) PCT No.: PCT/KR2019/013701
§ 371 (c)(1),
(2) Date: Apr. 19, 2021

(87) PCT Pub. No.: WO2020/080866
PCT Pub. Date: Apr. 23, 2020

(65) Prior Publication Data
US 2021/0379018 A1    Dec. 9, 2021

Related U.S. Application Data

(60) Provisional application No. 62/747,841, filed on Oct. 19, 2018.

(51) Int. Cl.
*A61K 31/41* (2006.01)
*A61P 25/02* (2006.01)
*A61P 25/04* (2006.01)

(52) U.S. Cl.
CPC .............. *A61K 31/41* (2013.01); *A61P 25/02* (2018.01); *A61P 25/04* (2018.01)

(58) Field of Classification Search
CPC ..................... A61K 31/41; A61P 25/02
See application file for complete search history.

(56) References Cited

FOREIGN PATENT DOCUMENTS

| JP | 2011-514356 A | 5/2011 |
|----|---------------|--------|
| KR | 10-1286499 B1 | 7/2013 |
| KR | 10-2017-0131241 A | 11/2017 |
| KR | 10-2018-0068494 A | 6/2018 |
| KR | 10-2019-0054549 A | 5/2019 |
| WO | WO-2015/112902 A2 | 7/2015 |
| WO | WO-2017/200318 A1 | 11/2017 |
| WO | WO-2018/111002 A1 | 6/2018 |
| WO | WO-2018/111006 A1 | 6/2018 |

OTHER PUBLICATIONS

Pubchem, "Cenobamate", 2006, National Library of Medicine (Year: 2006).*
Saeed et al., "Efficacy and tolerability of carbamazepine for the treatment of painful diabetic neuropathy in adults: a 12-week, open-label, multicenter study", 2014, International Journal of General Medicine, 8, pp. 339-343 (Year: 2014).*
Nakamura et al., "Mechanism of Action of Cenobamate: Preferential Inhibition of the Persistent Sodium Current (P5.278)", 2018, Neurology, 90, Poster Abstract (Year: 2018).*
Vinik, "Clinical Review: Use of antiepileptic drugs in the treatment of chronic painful diabetic neuropathy", 2005, The Journal of Clinical Endocrinology & Metabolism, 90, pp. 4936-4945 (Year: 2005).*
Lersch et al., "Prevention of oxaliplatin-induced peripheral sensory neuropathy by carbamazepine in patients with advanced colorectal cancer", 2002, Clinical Colorectal Cancer, 2, pp. 54-58 (Year: 2002).*
Zaccara et al., "Antiepileptic Drugs in Clinical Development: Differentiate or Die?", 2017, Current Pharmaceutical Design, 23, pp. 5593-5605 (Year: 2017).*
Eisenberg et al., "Lamotrigine reduces painful diabetic neuropathy", 2001, Neurology, 57, pp. 505-509 (Year: 2001).*
"Mexiletine", Wikipedia, accessed Apr. 19, 2024, 4 pgs. (Year: 2024).*
International Search Report from corresponding PCT Application No. PCT/KR2019/013701, dated Jan. 20, 2020.
Extended European Search Report from corresponding European Patent Application No. 19873768.6, dated May 31, 2022.
Novel Neurotherapeutic for Epilepsy, Neuropathic Pain and Bipolar Disorder, SK Biopharmaceuticals, 2012.
M. Bialer et al., Epilepsy Research, 2010, vol. 92, pp. 89-91, 119-120.
E.G. Montfort et al., "Neuropathic Pain: A Review of Diabetic Neuropathy", US Pharm., 2010, vol. 35, pp. HS8-HS15.
S.L. Collins et al., "Antidepressants and Anticonvulsants for Diabetic Neuropathy and Postherpetic Neuralgia: A Quantitative Systematic Review", Journal of Pain and Symptom Management, 2000, vol. 20, No. 6, pp. 449-458.
R.N. Kajih et al., "Management of Chemotherapy-Induced Peripheral Neuropathy", US Pharm., 2015, vol. 40, pp. HS5-HS10.
M.D. Mashkovsky, Drugs, 16th ed., Moscow, Novaya Volna, 2012, p. 1216.
A.T. Florence et al., Physicochemical Principles of Pharmacy, 3rd ed., 1998, p. 564.
C.R. Cashman et al., "Mechanisms of Distal Axonal Degeneration in Peripheral Neuropathies", Neurosci Lett., 2015, vol. 596, pp. 33-50.

(Continued)

*Primary Examiner* — Jeffrey H Murray
*Assistant Examiner* — Madeline E Braun
(74) *Attorney, Agent, or Firm* — Harness, Dickey & Pierce, P.L.C.

(57) ABSTRACT

The present invention relates to use of a carbamate compound of Formula 2 for the purpose of preventing, alleviating or treating diabetic peripheral neuropathy or chemotherapy-induced peripheral neuropathy by administering a pharmaceutical composition comprising a carbamate compound of Formula 2.

9 Claims, 3 Drawing Sheets

(56) References Cited

OTHER PUBLICATIONS

P.R. Bourque et al., Clinica Chemica Acta, 2015, vol. 449, pp. 37-42.
G. Said, Nature Clinical Practice Neurology, 2007, vol. 3, No. 6, pp. 331-340.
L. Colloca et al., Nature Reviews, 2017, vol. 3, No. 1.
X. Zhang et al., Biomedical Reports. 2017, vol. 6, No. 3, pp. 267-271.
Office Action from corresponding EP Application No. 19873768.6, dated Feb. 12, 2025.

\* cited by examiner

USE OF CARBAMATE COMPOUND FOR PREVENTING, ALLEVIATING OR TREATING DIABETIC PERIPHERAL NEUROPATHY OR CHEMOTHERAPY-INDUCED PERIPHERAL NEUROPATHY

CROSS-REFERENCE TO RELATED APPLICATIONS

This application is a national phase application of PCT Application No. PCT/KR2019/013701, filed on Oct. 18, 2019, which claims the benefit and priority to U.S. Patent Application No. 62/747,841, filed on Oct. 19, 2018. The entire disclosures of the applications identified in this paragraph are incorporated herein by references.

TECHNICAL FIELD

The present invention relates to use of a carbamate compound of the following Formula 1 for the purpose of preventing, alleviating or treating diabetic peripheral neuropathy or chemotherapy-induced peripheral neuropathy by administering a pharmaceutical composition comprising said carbamate compound:

[Formula 1]

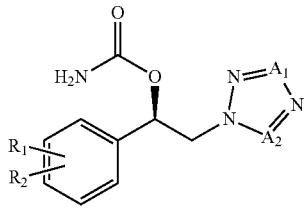

wherein,
$R_1$, $R_2$, $A_1$ and $A_2$ are as defined herein.

BACKGROUND ART

Peripheral neuropathy refers to structural and functional disorders of the peripheral nerve consisting of motor, sensory and autonomic nerves, and various symptoms appear depending on the type of nerve in which the disorder occurs. Peripheral neuropathy may be a disease of its own, or may be caused by other diseases such as ischemia or diabetes, or may be caused by side effects of chemotherapy and radiation therapy. Symptoms may include various combinations of lethargy, autonomic nervous system and sensory changes. Especially, sensory neuropathy shows positive symptoms including loss of sensation, tingling and pain depending on which nerves and organs are affected.

Among peripheral neuropathy, neuropathy caused as a complication of diabetes is the most common, and about 34% of diabetics suffer from diabetic peripheral neuropathy (DPN). However, it is known that 50% of diabetic peripheral neuropathy is asymptomatic and this makes the disease worse. Diabetic peripheral neuropathy includes paresthesia and pain, allodynia, hyperalgesia, numbness, muscle weakness and cramps, Patients do not feel changes in temperature or wounds, or have numbing, tingling, stinging, or burning pains due to paresthesia, and have reduced reflexes, balance and coordination due to muscle weakness. In the case of diabetic peripheral neuropathy accompanying pain, pathologically worsening pain is a major cause of decreasing quality of life, and it is sometimes accompanied by depression.

In order to fundamentally prevent or delay the progression of diabetic peripheral neuropathy, glycemic control is essentially necessary to prevent peripheral nerve damage. Treatment includes etiological treatment and symptomatic treatment.

There have been generally used, low-dose tricyclic antidepressants such as nortriptyline or amitriptyline, a serotonin-norepinephrine reuptake inhibitor (SNRI) such as duloxetine, and anticonvulsant therapy such as gabapentin or pregabalin. In addition, acetaminophen or nonsteroidal anti-inflammatory drug (NSAID) has been used as analgesics. However, current therapies are insufficient to show satisfactory efficacy since they are at the level of less than 30% pain reduction in 20 to 40% of patients. (Lancet Neurol. 2015; 14: 162-173)

Chemotherapy increases the survival rate of many cancer patients but causes various side effects. Among them, chemotherapy-induced peripheral neuropathy (CIPN) has a prevalence of 68%, remains a symptom from several weeks to several months after treatment and is a representative side effect of chemotherapy suffering from pain syndrome for many years. Among the chemotherapeutic agents, platinum-based drugs, taxanes and vinca alkaloids are known to cause CIPN, and they are mainly used for patients with colorectal cancer; stomach cancer; breast cancer and blood cancer. CIPN is caused by degeneration of nerve cells due to damage of the myelin sheath surrounding nerve axons by chemotherapy, and the main symptoms include sensory disorders such as pain, paresthesia, allodynia, hyperalgesia, numbness and the like; motor neuron disorders such as muscle weakness, cramps, hypotonia and the like; and autonomic nerve disorders such as hypotension, sweating, gastrointestinal abnormalities and the like.

In chemotherapy, the higher the dose, the shorter the frequency of drug administration, and the higher the number of drugs administered together, the higher the probability of incidence. It is also known that the incidence rate is high in cases where patients have had other neuropathy before.

When CIPN develops, various attempts have been made that set forth by the National Comprehensive Cancer Network guideline in the manner of discontinuing chemotherapy or reducing the dose to increase the viability of peripheral nerves. In the treatment of CIPN, duloxetine is moderately recommended. In addition, tricyclic antidepressants, the combination of gabapentin and opioid, and the triple combination of baclofen+amitriptyline+ketamine have been suggested as possible treatments. Furthermore, although drug efficacy has not been proven, combinations of various drugs such as alpha-lipoic acid, amifostine, amitriptyline, calcium & magnesium; etc. have been used.

SUMMARY

Problem to be Solved

The present invention is intended to provide a method for the prevention, alleviation or treatment of diabetic peripheral neuropathy or chemotherapy-induced peripheral neuropathy.

The present invention is also intended to provide the use of a carbamate compound of the following Formula 1, or a pharmaceutically acceptable salt, solvate or hydrate thereof, for the prevention, alleviation or treatment of diabetic peripheral neuropathy or chemotherapy-induced peripheral neuropathy:

[Formula 1]

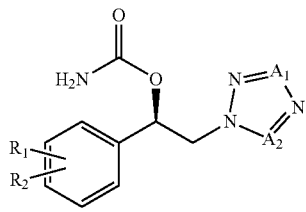

wherein,
$R_1$, $R_2$, $A_1$ and $A_2$ are as defined herein.

Technical Solution to the Problem

The present invention provides a medicament for the prevention, alleviation or treatment of diabetic peripheral neuropathy or chemotherapy-induced peripheral neuropathy, comprising a therapeutically effective amount of a carbamate compound of the following Formula 1, or a pharmaceutically acceptable salt, solvate or hydrate thereof:

[Formula 1]

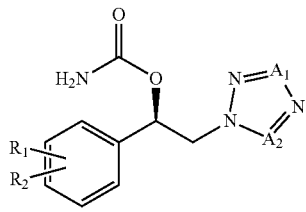

wherein,
$R_1$ and $R_2$ are each independently selected from the group consisting of hydrogen, halogen, $C_1$-$C_8$ alkyl, halo-$C_1$-$C_8$ alkyl, $C_1$-$C_8$ thioalkoxy and $C_1$-$C_8$ alkoxy; and
one of $A_1$ and $A_2$ is CH, and the other is N.

In addition, the present invention provides a pharmaceutical composition for the prevention, alleviation or treatment of diabetic peripheral neuropathy or chemotherapy-induced peripheral neuropathy, comprising a therapeutically effective amount of the carbamate compounds of the above Formula 1, or a pharmaceutically acceptable salt, solvate or hydrate thereof, and further one or more of a pharmaceutically acceptable carrier.

In addition, the present invention provides a method for preventing, alleviating or treating diabetic peripheral neuropathy or chemotherapy-induced peripheral neuropathy, in a subject, comprising administering to the subject a therapeutically effective amount of the carbamate compounds of the above Formula 1, or a pharmaceutically acceptable salt, solvate or hydrate thereof.

In addition, the present invention provides the use of the carbamate compounds of the above Formula 1, or a pharmaceutically acceptable salt, solvate or hydrate thereof for the prevention, alleviation or treatment of diabetic peripheral neuropathy or chemotherapy-induced peripheral neuropathy, or for the improvement of symptoms associated therewith.

According to one embodiment of the present invention, in the above Formula 1, $R_1$ and $R_2$ are each independently selected from the group consisting of hydrogen, halogen and $C_1$-$C_8$ alkyl.

In one embodiment of the present invention, the halo-$C_1$-$C_8$ alkyl is perfluoroalkyl.

According to another embodiment of the present invention, the carbamate compound of the above Formula 1 is carbamic acid (R)-1-(2-chlorophenyl)-2-tetrazol-2-yl)ethyl ester of the following Formula 2:

[Formula 2]

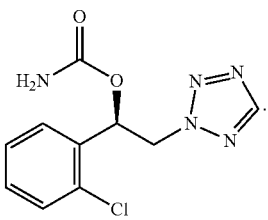

A person having ordinary skill in the art of synthesis of compounds could have easily prepared the carbamate compounds of the above Formulas 1 and 2 using known compounds or compounds which can be easily prepared therefrom. Specifically, methods for preparing the compounds of the above Formula 1 are described in detail in International Publication Nos. WO 2006/112685 A1, WO 2010/150946 A1 and WO 2011/046380 A2, the disclosures of which are incorporated herein by reference. The compounds of the above Formula 1 can be chemically synthesized by any of the methods described in the above documents, but the methods are merely exemplary ones, and the order of the unit operation and the like may be selectively changed if necessary. Hence, the above methods are not intended to limit the scope of the invention.

The carbamate compounds of the above Formula 1 can be used for the prevention, alleviation or treatment of diabetic peripheral neuropathy or chemotherapy-induced peripheral neuropathy.

Diabetic peripheral neuropathy is one of chronic sensorimotor neuropathy and includes painful diabetic peripheral neuropathy or diabetic autonomic neuropathy.

Chemotherapy-induced peripheral neuropathy afflicts about 40% of patients undergoing chemotherapy, and symptoms vary depending on the chemotherapeutic agents used—for example, the mechanism and dose of anticancer agents, and duration. The main types of chemotherapeutic agents that cause chemotherapy-induced peripheral neuropathy include platinum-based drugs, taxanes and vinca alkaloids.

The dosage of the carbamate compounds of Formula 1 for the prevention, alleviation or treatment of the above diseases may typically vary depending on the severity of the disease, the body weight and the metabolic status of the subject. A "therapeutically effective amount" for an individual patient refers to an amount of the active compound sufficient to achieve the above pharmacological effect, i.e., the therapeutic effect as described above. The therapeutically effective amount of the compounds of the present invention is 50 to 500 mg, 50 to 400 mg, 50 to 300 mg, 100 to 400 mg, 100 to 300 mg, 50 to 200 mg, or 100 to 200 mg, based on the free form and once-daily administration to humans. The therapeutically effective amount is preferably 50 to 300 mg, more preferably 50 to 200 mg.

The compounds of the present invention may be administered by any conventional method used for administration of a therapeutic agent, such as oral, parenteral, intravenous, intramuscular, subcutaneous or rectal administration.

A therapeutically effective amount of the carbamate compounds of the above Formula 1 may be accomplished by a proper titration method. According to one embodiment of the present invention, the titration method may comprise (1) a step of administering to the patient 12.5 mg of the compound of formula 1 once a day for two weeks; (2) then a step of administering to the patient 25 mg of the compound of Formula 1 once a day for two weeks; (3) then a step of administering to the patient 50 mg of the compound of Formula 1 once a day for two weeks; and (4) a step of increasing the amount of 50 mg or less of the compound of Formula 1 once a day at two-week intervals until a therapeutically effective amount is obtained. According to another embodiment of the present invention, the titration method may comprise (1) a step of administering to the patient 50 mg of the compound of Formula 1 once a day for two weeks; (2) then a step of increasing the amount of 50 mg of the compound of Formula 1 once a day at two-week intervals until 200 mg of the compound of Formula 1 is administered once a day, wherein the compound of Formula 1 is administered for 6 weeks, and the therapeutically effective amount is 200 mg/day. According to still another embodiment of the present invention, the titration method may comprise (1) a step of administering to the patient 50 mg of the compound of Formula 1 once a day, wherein the amount is increased by 50 mg every week until the dosage is 100 mg/day, and after step (1) further (2) a step of increasing the amount by 50 mg every week until the dosage is 200 mg/day; or (3) a step of increasing the amount by 100 mg every week until the dosage is 400 mg/day, wherein the compound of Formula 1 may be administered for 2, 4 or 6 weeks depending on a therapeutically effective amount (100 mg/day, 200 mg/day or 400 mg/day).

In addition to the methods described above, appropriate titration methods may be used to accomplish a therapeutically effective amount of the compound of Formula 1.

According to another embodiment of the present invention, there is provided a medicament for the prevention, alleviation or treatment of diabetic peripheral neuropathy or chemotherapy-induced peripheral neuropathy, comprising a therapeutically effective amount of a carbamate compound of the above Formula 1, or a pharmaceutically acceptable salt, solvate or hydrate thereof.

Examples of symptoms of diabetic peripheral neuropathy or chemotherapy-induced peripheral neuropathy include, but are not limited to, paresthesia, hyperalgesia, allodynia, numbness, loss of vibratory or positional sense, muscle weakness, hypotonia, cramps, hypotension, sweating or gastrointestinal abnormalities.

The medicament or pharmaceutical composition according to one embodiment of the present invention may comprise a therapeutically effective amount of a compound selected from the group consisting of the carbamate compounds of the present invention, their pharmaceutically acceptable salts, solvates, hydrates and combinations thereof.

Examples of the pharmaceutically acceptable salts of the carbamate compounds of the above Formula 1 include independently, acetate, benzenesulfonate, benzoate, bitartrate, calcium acetate, camsylate, carbonate, citrate, edetate, edisylate, estolate, esylate, fumarate, gluceptate, gluconate, glutamate, glycoloyl arsanilate, hexylresorcinate, hydravamine, hydrobromide, hydrochloride, hydrogencarbonate, hydroxynaphthoate, iodide, isethionate, lactate, lactobionate, malate, maleate, mandelate, mesylate, methylnitrate, methylsulfate, mucate, napsylate, nitrate, pamoate (embonate), pantothenate, phosphate/diphosphate, polygalacturonate, salicylate, stearate, subacetate, succinate or hemisuccinate, sulfate or hemi-sulfate, tannate, tartrate, oxalate or hemi-tartrate, teoclate, triethiodide, benzathine, chloroprocaine, choline, diethanolamine, ethylenediamine, meglumine, procaine, aluminum, ammonium, tetramethylammonium, calcium, lithium, magnesium, potassium, sodium and zinc.

The medicament or pharmaceutical composition according to one embodiment of the present invention may be administered orally or parenterally. The parenteral administration may include intravenous injection, subcutaneous injection, intramuscular injection, intraperitoneal injection, endothelial administration, topical administration, intranasal administration, intravaginal administration, intrapulmonary administration, rectal administration and the like. In the case of oral administration, the pharmaceutical composition according to one embodiment of the present invention may be formulated as a plain tablet (uncoated tablet) or such that the active agent is coated or it is protected against degradation in the stomach. In addition, the composition can be administered by any device capable of transferring the active substance to a target cell. The route of administration may vary depending upon the general condition and age of the subject to be treated, the nature of the treatment condition and the active ingredient selected.

A suitable dosage of the medicament or pharmaceutical composition according to one embodiment of the present invention may vary depending on factors such as the formulation method, administration method, age, body weight and gender of patients, pathological condition, diet, administration time, administration route, excretion rate and reaction sensitivity, and doctors having ordinary skill can easily determine and prescribe dosages that are effective for the desired treatment or prophylaxis. The pharmaceutical composition according to one embodiment may be administered in one or more doses, for example, one to four times per day. The pharmaceutical composition according to one embodiment may contain the compounds of Formula 1 in the amount of 50 to 500 mg, 50 to 400 mg, 50 to 300 mg, 100 to 400 mg, 100 to 300 mg, 50 to 200 mg, or 100 to 200 mg, preferably 50 to 300 mg, more preferably 50 to 200 mg, based on the free form.

The medicament or pharmaceutical composition according to one embodiment of the present invention may be formulated using a pharmaceutically acceptable carrier and/or excipient according to a method that a person having ordinary skill in the art could easily carry out, thereby to be prepared in a unit dose form or to be contained in a multi-dose container. The above formulation may be a solution in oil or an aqueous medium, a suspension or an emulsion (emulsified solution), an extract, a powder, granules, a tablet, or a capsule, and may further include a dispersing or stabilizing agent. In addition, the pharmaceutical composition may be administered in the form of suppositories, sprays, ointments, creams, gels, inhalants or skin patches. The pharmaceutical composition may also be prepared for mammalian administration, more preferably for human administration.

Pharmaceutically acceptable carriers may be solid or liquid, and may be one or more selected from fillers, antioxidants, buffers, bacteriostats, dispersants, adsorbents, surfactants, binders, preservatives, disintegrants, sweeteners, flavors, glidants, release-controlling agents, wetting agents, stabilizers, suspending agents and lubricants. In addition, the pharmaceutically acceptable carriers may be selected from saline, sterile water, Ringer's solution, buffered saline, dextrose solution, maltodextrin solution, glycerol, ethanol and mixtures thereof.

In one embodiment, suitable fillers include, but are not limited to, sugar (e.g., dextrose, sucrose, maltose and lactose), starch (e.g., corn starch), sugar alcohol (e.g., mannitol, sorbitol, maltitol, erythritol and xylitol), starch hydrolysate (e.g., dextrin and maltodextrin), cellulose or cellulose derivatives (e.g., microcrystalline cellulose) or mixtures thereof.

In one embodiment, suitable binders include, but are not limited to, povidone, copovidone, methylcellulose, hydroxypropylmethylcellulose, hydroxypropylcellulose, hydroxyethylcellulose, gelatin, gum, sucrose, starch or mixtures thereof.

In one embodiment, suitable preservatives include, but are not limited to, benzoic acid, sodium benzoate, benzyl alcohol, butylated hydroxyanisole, butylated hydroxytoluene, chlorbutol, gallate, hydroxybenzoate, EDTA or mixtures thereof.

In one embodiment, suitable disintegrants include, but are not limited to, sodium starch glycolate, cross-linked polyvinylpyrrolidone, cross-linked carboxymethylcellulose, starch, microcrystalline cellulose or mixtures thereof.

In one embodiment, suitable sweeteners include, but are not limited to, sucralose, saccharin, sodium saccharin, potassium saccharin, calcium saccharin, acesulfame potassium or sodium cyclamate, mannitol, fructose, sucrose, maltose or mixtures thereof.

In one embodiment, suitable glidants include, but are not limited to, silica, colloidal silicon dioxide, talc and the like.

In one embodiment, suitable lubricants include, but are not limited to, long chain fatty acids and salts thereof, such as magnesium stearate and stearic acid, talc, glyceride wax or mixtures thereof.

The carbamate compounds of the above Formula 1 may be used along with an additional drug(s) for the prevention, alleviation or treatment of diabetic peripheral neuropathy or chemotherapy-induced peripheral neuropathy.

According to still another embodiment of the present invention, there is provided a combination for the prevention, alleviation or treatment of diabetic peripheral neuropathy or chemotherapy-induced peripheral neuropathy, comprising a therapeutically effective amount of a carbamate compound of the above Formula 1 and such additional drug(s).

According to still another embodiment of the present invention, examples of additional drug include, but are not limited to, in the case of diabetic peripheral neuropathy, analgesics such as acetaminophen or nonsteroidal anti-inflammatory drug (NSAID), tricyclic antidepressants such as nortriptyline or amitriptyline, antidepressants such as monoamine oxidase (MAO) inhibitors, anticonvulsants such as gabapentin or pregabalin, or a combination of baclofen+amitriptyline+ketamine; and in the case of chemotherapy-induced peripheral neuropathy, analgesics such as acetaminophen or NSAID, tricyclic antidepressants such as nortriptyline or amitriptyline, antidepressants such as MAO inhibitors, anticonvulsants such as gabapentin or pregabalin, opioids, or capsaicin.

In still another embodiment of the present invention, when a medicament or pharmaceutical composition according to the present invention is the combination described above, the weight ratio (a:b) of the carbamate compound of the above Formula 1 [ingredient (a)] and the additional drug [ingredient (b)] may be within the scope of 1,000:1 to 1:1,000, or 500:1 to 1:500, or 100:1 to 1:100, or 50:1 to 1:50, or 10:1 to 1:10, but is not limited thereto.

As used herein, the terms "prevent," "preventing" and "prevention" refer to reducing or eliminating the likelihood of a disease.

As used herein, the terms "alleviate," "alleviating" and "alleviation" refer to ameliorating a disease and/or its accompanying symptoms altogether or in part.

As used herein, the terms "treat," "treating" and "treatment" refer to eliminating a disease and/or its accompanying symptoms altogether or in part.

As used herein, the term "subject" refers to an animal that is the object of therapy, observation or experiment, preferably a mammal (such as primates (e.g., a human), cattle, sheep, goats, horses, dogs, cats, rabbits, rats, mice, etc.), most preferably a human.

As used herein, the term "therapeutically effective amount" refers to the amount of active compound or pharmaceutical formulation that elicits a biological or medical response in the system, animal or human, including alleviation of the symptoms of the disease or disorder to be treated, wherein said amount is sought by a researcher, veterinarian, doctor (physician) or other clinician.

As used herein, the term "composition" encompasses a product that contains a specified amount of a particular ingredient and any product that results directly or indirectly from a combination of specified amounts of particular ingredients.

Effect of the Invention

The medicament and the combination according to the present invention can effectively prevent, alleviate and treat diabetic peripheral neuropathy or chemotherapy-induced peripheral neuropathy.

DETAILED DESCRIPTION

Hereinafter, the present invention will be explained in more detail through working examples. However, the following working examples are only intended to illustrate one or more embodiments and are not intended to limit the scope of the invention.

Preparation Example: Synthesis of Carbamic Acid (R)-1-(2-chlorophenyl)-2-tetrazol-2-yl)ethyl ester Carbamic acid (R)-1-(2-chlorophenyl)-2-tetrazol-2-yl) ethyl ester (hereinafter referred to as "Test Compound") was prepared according to the method described in Preparation Example 50 of International Publication No. WO 2010/150946.

Example 1: Diabetic Peripheral Neuropathy Model Test

Experimental Animals

Male rats (Sprague-Dawley, 160 to 180 g, Harlan Laboratories, Israel) were purchased and subjected to acclimatization for more than 1 week at an animal laboratory. The experimental animals were maintained at a light-and-darkness cycle of 12 hours, a temperature of 20 to 24° C., a relative humidity of 40 to 60%, and free access to water and food.

Measurement of Mechanical Allodynia (Von Frey Test)

The degree of pain was assessed by withdrawal (avoidance response) using von Frey filaments. Mechanical stimuli were applied to the right hind paw by the use of an up-down method, and the lowest bending force showing avoidance response was defined as the paw withdrawal threshold (J Neurosci Methods, 1994; 53 (1): 55-63). First, the rats were placed in an acrylic box (13×25×13 cm$^3$) located on a wire mesh installed at a height of about 35 cm from the floor and stabilized for more than 20 minutes. Among von Frey filaments with various bending forces (0.008, 0.02, 0.04, 0.07, 0.16, 0.4, 0.6, 1.0, 1.4, 2.0, 4.0, 6.0, 8.0, 10.0, 15.0, 26.0, 60.0, 100, 180 and 300 g), the stimulus was started with 2.0 g of filament. The stimulus was applied to the extent of slightly bending in the direction perpendicular to the plantar surface, and the rats were stimulated with a filament with lower or higher bending force, depending on with and without reaction, Induction of Diabetic Peripheral Neuropathic Pain This experiment was conducted to investigate the analgesic effects of compound treatment at two different doses (10 mg/kg and 30 mg/kg) in a diabetic peripheral neuropathic pain model of rats induced by streptozotocin (STZ).

Diabetes was induced by 0.5 ml injection of streptozotocin (60 mg/kg) dissolved in citrate buffer (pH=6) into the tail vein of the rat. Animals were placed under a red lamp before injection and locked in a restraint device for administration.

Figure 1:
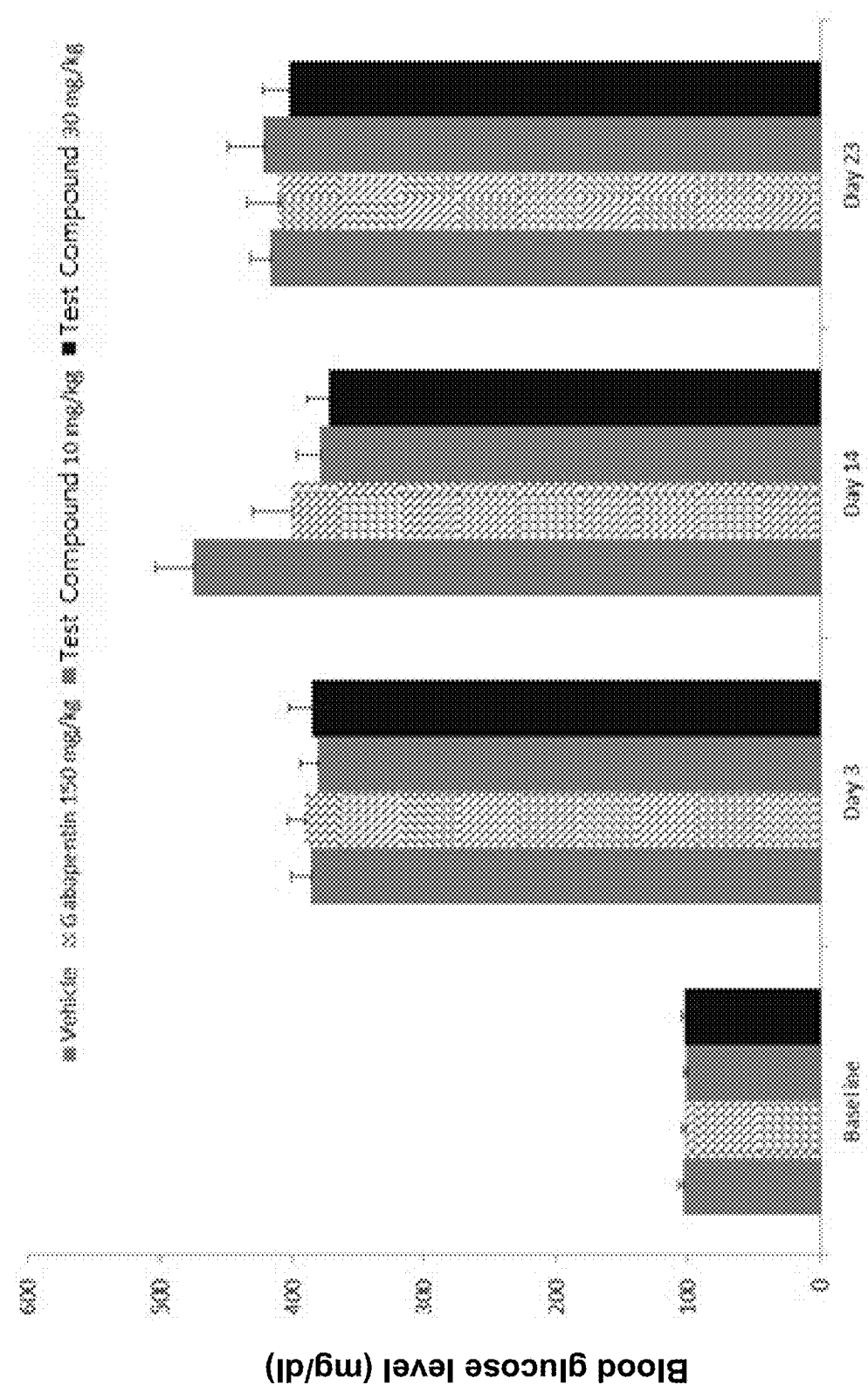
FIG. 1 shows average blood glucose level (BGL) measured in all animals to ascertain induction of diabetes in rats with streptozotocin. The average BGL at baseline was 102.52±0.93 mg/dl but increased to 385.33±7.28 mg/dl 3 days after streptozotocin administration. Elevated BGL was maintained throughout the trial period; an average BGL was 405.05±12.74 mg/dl on day 14, and an average BGL was 412.52±10.77 mg/dl on day 23. From the above, it was confirmed that diabetes was induced and maintained during the trial period.

In a streptozotocin (STZ)-induced diabetic peripheral neuropathic pain rat model, diabetic peripheral neuropathy was induced between 14 and 24 days after injection of STZ through the tail blood vessel of the rat. Blood glucose levels (BGL) of all animals on day 3 of the test were used to determine whether diabetes was induced, and on day 14, animals showing signs of mechanical allodynia by von Frey test were tested for BGL on day 14 and 23 of the experiment (FIG. 1).

The Test Compound group, the positive control group and the negative control group were administered daily from day 14 to day 24 (administration route: negative control group and Test Compound group-PO, positive control group-IP). Pain tests were performed on day 14 and day 24 of the experiment immediately before and 2 hours after administration in the negative control group, the Test Compound group and the positive control group. After the experiment, all animals were euthanized with $CO_2$.

Results

1) Results of Von Frey Test at 10 mg/Kg and 30 mg/Kg of Test Compound:

The mean bending force required for inducing the avoidance response of the negative control group animals at baseline as compared to the group administering vehicle on day 14 and day 24 was 60.00±0.00 g. On day 14 of the experiment, before drug administration the withdrawal bending force due to mechanical allodynia was significantly lowered (18.55±2.47 g), and on day 24 of the experiment, before drug administration mechanical allodynia was still present (23.00±5.35 g).

On day 14 of the experiment, the mean bending force of the positive control group (gabapentin at the dose of 150 mg/kg IP) was 51.85±4.91 g, showing no significant allodynia suppressive effect compared to 34.50±6.61 g of vehicle. That of administering Test Compound (10 mg/kg PO) was 46.09±4.48 g, also showing a tendency of allodynia suppressive effect compared to 34.50±6.61 g of vehicle. Administration of 30 mg/kg PO of Test Compound also showed a tendency of allodynia suppressive effect (Test Compound 30 mg/kg 50.23±3.89 g vs. vehicle 34.50±6.61 g).

Figure 2:
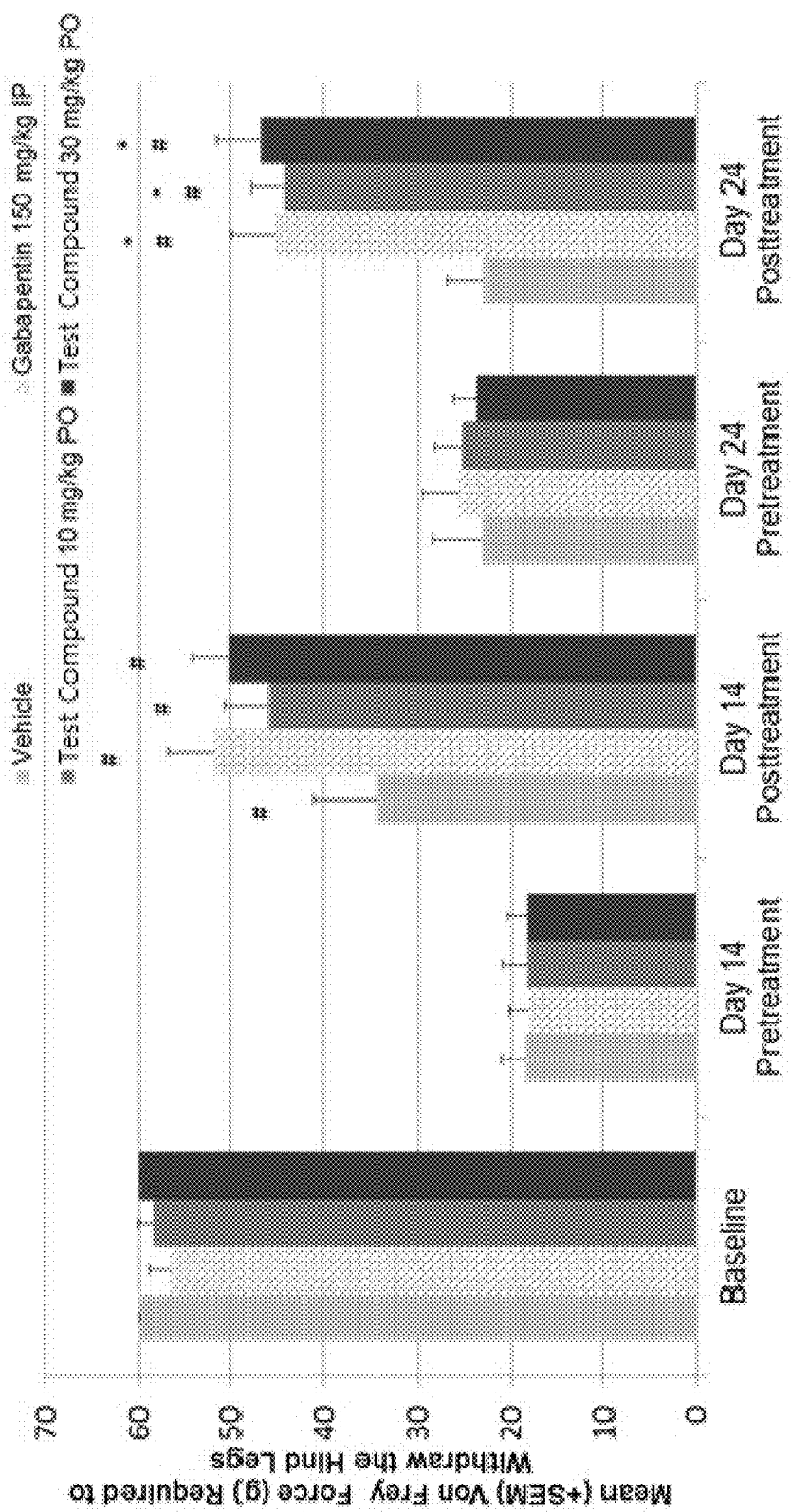
FIG. 2 shows the results that the prevention and treatment effects on mechanical allodynia were compared with the negative control group—in which vehicle was administered—by von Frey test of rats in which mechanical allodynia was induced with streptozotocin, and carbamic acid (R)-1-(2-chlorophenyl)-2-tetrazol-2-yl)ethyl ester (hereinafter referred to as "Test Compound") prepared in the Preparation Example and the positive control compound (gabapentin) were administered.
Figure 3:
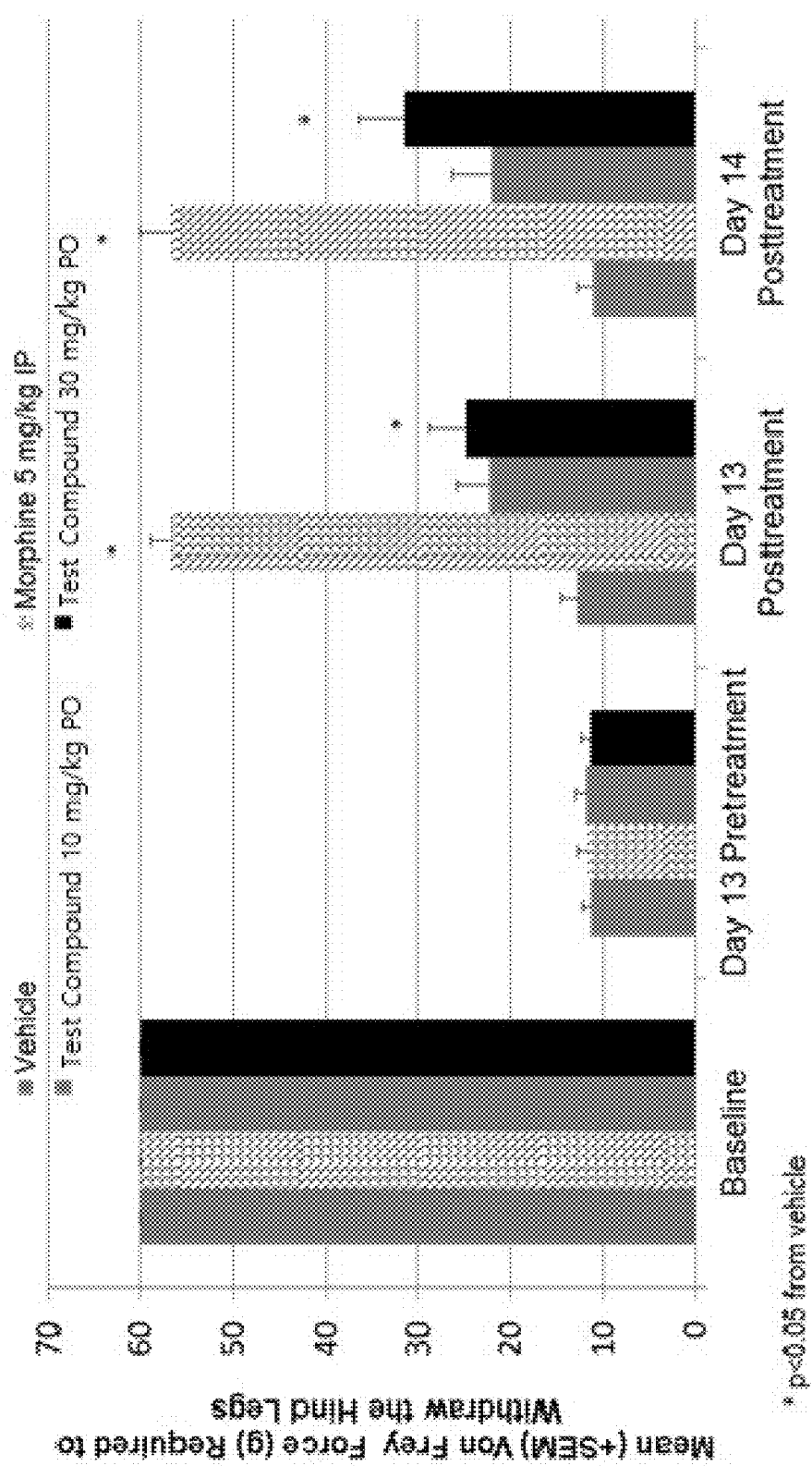
FIG. 3 shows the results that the prevention effect on mechanical allodynia was compared with the negative control group—in which vehicle was administered—by von Frey test of rats in which mechanical allodynia was induced with taxol, and Test Compound and the positive control compound were administered. Taxol-induced peripheral neuropathy was induced by intraperitoneal (IP) administration of 2 mg/kg of taxol at a dose of 0.5 ml/kg to rats on days 1, 3, 5, 7 and 9.

On day 24 of the experiment, the mean bending force of the positive control group (gabapentin at the dose of 150 mg/kg IP) was 45.30±4.63 g, showing significant allodynia suppressive effect compared to 22.85±3.86 g of vehicle. That of administering Test Compound (10 mg/kg PO) was 44.36±3.63 g, also showing significant allodynia suppressive effect compared to 22.85±3.86 g of vehicle, That of administering Test Compound (30 mg/kg PO) was 46.91±4.46 g, also showing significant allodynia suppressive effect compared to 22.85±3.86 g of vehicle (FIG. 2).

2) Results of Von Frey Test at 10 mg/Kg and 30 mg/Kg of Test Compound on Day 14 and Day 24 (Pre-Treatment Vs. Post-Treatment):

On day 14 of the experiment, the bending force of 18.15±2.07 g before administration of the positive control group was changed to 51.85±4.91 g after administration of gabapentin (150 mg/kg IP), showing that the induction of allodynia was significantly inhibited. The bending force of 18.23±2.66 g before administration was changed to 46.09±4.48 g after administration of Test Compound (10 mg/kg PO), showing that the induction of allodynia was significantly inhibited. In the case of the administration of 30 mg/kg PO of Test Compound, bending force of 18.23±2.17 g before administration was changed to 50.23±3.89 g after administration, also showing that the induction of allodynia was significantly inhibited.

On day 24 of the experiment, the bending force of 25.50±3.95 g before administration of the positive control group was changed to 45.30±4.63 g after administration of gabapentin (150 mg/kg IP), showing that the induction of allodynia was significantly inhibited. The bending force of 25.18±2.96 g before administration was changed to 44.36±3.63 g after administration of Test Compound (10 mg/kg PO), showing that the induction of allodynia was significantly inhibited. In the case of the administration of 30 mg/kg PO of Test Compound, the bending force of 23.55±2.52 g before administration was changed to 46.91±4.46 g after administration, also showing that the induction of allodynia was significantly inhibited (FIG. 2).

Conclusion

According to the present invention, in a streptozotocin-induced rat model of DPN when compared with the highest dose (150 mg/kg) of gabapentin—which is a positive control used in the treatment of DPN for allodynia, the low dose (10 mg/kg) of Test Compound showed ~75% pain reduction compared to the negative control, which is an efficacy similar to 150 mg/kg of gabapentin. From such results, it was confirmed that administration of 10 mg/kg and 30 mg/kg of Test Compound is effective in suppressing mechanical allodynia. From this, it can be known that administration of the Test Compound is effective for diabetic peripheral neuropathy.

Example 2: Chemotherapy-Induced Peripheral Neuropathy Model Test

Experimental Animals

Male rats (Sprague-Dawley, 160 to 180 g, Harlan Laboratories, Israel) were purchased and subjected to acclimatization for more than 1 week at an animal laboratory. The experimental animals were maintained at a light-and-darkness cycle of 12 hours, a temperature of 20 to 24° C., a relative humidity of 40 to 60%, and free access to water and food.

Measurement of Mechanical Allodynia (Von Frey Test)

The degree of pain was assessed by withdrawal (avoidance response) using von Frey filaments. Mechanical stimuli were applied to the right hind paw by the use of an up-down method, and the lowest bending force showing avoidance response was defined as the paw withdrawal threshold (J Neurosci Methods, 1994; 53 (1): 55-63). First, the rats were placed in an acrylic box (13×25×13 cm$^3$) located on a wire mesh installed at a height of about 35 cm from the floor and stabilized for more than 20 minutes. Among von Frey filaments with various bending forces (0.008, 0.02, 0.04, 0.07, 0.16, 0.4, 0.6, 1.0, 1.4, 2.0, 4.0, 6.0, 8.0, 10.0, 15.0, 26.0, 60.0, 100, 180 and 300 g), the stimulus was started with 2.0 g of filament. The stimulus was applied to the extent of slightly bending in the direction perpendicular to the plantar surface, and the rats were stimulated with a filament with lower or higher bending force, depending on with and without reaction.

Induction of Taxol-Induced Painful Neuropathy

To induce peripheral neuropathy, 2 mg/kg of taxol—which is an anticancer agent commonly used for the treatment of solid cancers—was intraperitoneally (IP) administered at a dose of 0.5 ml/kg on days 1, 3, 5, 7 and 9. To confirm the induction of allodynia, von Frey test was used, and in the study only animals having 43 g or less of average pain threshold of hind paws were included.

On day 13 of the experiment, only animals—in which allodynia was verified by von Frey test—were selected as experimental groups, Test Compounds (10 mg/kg and 30 mg/kg) and vehicle as the negative control were orally administered 2 hours before the pain test on day 13 and day 14. Morphine (5 mg/kg) as the positive control was administered 30 minutes prior to the pain test by intraperitoneal administration on day 13 and day 14 of the experiment. After the experiment, all animals were euthanized with $CO_2$.

Results

A pain-induction model via taxol administration to rats is a well-known model of chemotherapy-induced peripheral neuropathy. The induction of hyperalgesia by administering taxol on days 1, 3, 5, 7 and 9 was confirmed by von Frey test prior to drug treatment, and maintenance of hyperalgesia during the experimental period was confirmed from the data of the negative control group (vehicle administration) after drug treatment on day 13 and day 14.

On day 13 of the experiment, the morphine-administration (5 mg/kg IP) group showed a significant inhibitory effect on the induction of allodynia compared to the vehicle-administration group. The Test Compound-administration (10 mg/kg) group showed a tendency to inhibit the induction of allodynia compared to the vehicle-administration group, and the Test Compound-administration (30 mg/kg) group showed a significant inhibitory effect on the induction of allodynia compared to the vehicle-administration group.

On day 14 of the experiment, the morphine-administration (5 mg/kg IP) group showed a significant inhibitory effect on the induction of allodynia compared to the vehicle-administration group. The Test Compound-administration (10 mg/kg) group showed a tendency to inhibit the induction of allodynia compared to the vehicle-administration group, and the Test Compound-administration (30 mg/kg) group showed a significant inhibitory effect on the induction of allodynia compared to the vehicle-administration group.

Conclusion

Considering the results obtained under the conditions of this study and the results limited in the lifestyle data, it was confirmed that the administration of Test Compound at a dose of 10 mg/kg showed a tendency to inhibit mechanical allodynia in the peripheral neuropathy model, and the administration of Test Compound at a dose of 30 mg/kg showed the significant inhibition of mechanical allodynia in the taxol-induced peripheral neuropathy model. From this, it can be known that administration of the Test Compound is effective for chemotherapy-induced peripheral neuropathy.

Statistics

Each experimental group was compared with the negative control group by using one-way ANOVA and Tukey Turkey post-test (Prism® GraphPad).

What is claimed is:

1. A method for alleviating or treating diabetic peripheral neuropathy or chemotherapy-induced peripheral neuropathy, comprising:
    administering to a subject in need thereof a therapeutically effective amount of a carbamate compound which is carbamic acid (R)-1-(2-chlorophenyl)-2-tetrazol-2-yl-ethyl ester of the following Formula 2, or a pharmaceutically acceptable salt or hydrate thereof:

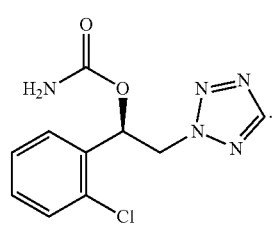

[Formula 2]

2. The method according to claim 1, wherein the subject is a mammal.

3. The method according to claim 1, wherein the therapeutically effective amount of the carbamate compound of Formula 2 is 50 to 500 mg based on a free form once-daily administration.

4. The method according to claim 3, wherein the therapeutically effective amount of the carbamate compound of Formula 2 is 50 to 400 mg based on a free form once-daily administration.

5. The method according to claim 4, wherein the therapeutically effective amount of the carbamate compound of Formula 2 is 50 to 300 mg based on a free form once-daily administration.

6. The method according to claim 5, wherein the therapeutically effective amount of the carbamate compound of Formula 2 is 50 to 200 mg based on a free form once-daily administration.

7. The method according to claim 1, wherein the diabetic peripheral neuropathy is painful diabetic peripheral neuropathy, diabetic autonomic neuropathy or both.

8. The method according to claim 1, wherein the chemotherapy-induced peripheral neuropathy is caused by a chemotherapeutic agent which is one or more selected from the group consisting of platinum-based drugs, taxanes, and vinca alkaloids.

9. The method according to claim 1, wherein the carbamate compound of Formula 2 is administered orally, parenterally, intravenously, intramuscularly, subcutaneously, or rectally.

* * * * *